Patented Mar. 7, 1950

2,499,865

UNITED STATES PATENT OFFICE 2,499,865

LIQUID ALKYL SILICONES AND METHOD FOR THEIR PREPARATION

Ralph K. Iler, Cleveland Heights, Ohio, assignor to E. I. du Pont de Nemours & Company, Wilmington, Del., a corporation of Delaware No Drawing. Application October 11, 1947, Serial No. 779,423

3 Claims. (Cl. 260—448.2)

This invention relates to novel, alkyl silicones and processes for producing them, and is more particularly directed to novel liquid alkyl silicones having from 1.0 to 1.1 alkyl groups per silicon atom and to processes for producing such silicones in which monoalkyl trichlorosilanes are hydrolyzed at about 0° C. and the resulting silanols are dehydrated under high vacuum to produce liquid condensation products.

Alkyl halo-silanes have heretofore been hydrolyzed at low temperatures and an ether solution of the resulting product has been distilled to give alkyl silicone products which, though initially viscous liquids, spontaneously form solid resinous products upon exposure to air at room temperature. In U. S. Patent 2,258,220, to Rochow, for instance, in Example 1 there is described a process in which a mixture of ethyl dichlorosilane and ethyl trichlorosilane in ether solution is hydrolyzed by pouring into cracked ice and the ether solution of silanols is separated, washed with water to remove acids, and then concentrated by distilling off substantially all of the ether. By this method a product is obtained which spontaneously condenses upon exposure to air at room temperature and hardens to a yellow, horny, insoluble and infusible resinous material. The product contains 0.8 alkyl groups per silicon atom. By a similar procedure in Example 2 a composition containing 1.1 alkyl groups per silicon atom, and which was a sticky resin, was obtained.

While compositions which are resinous solids or which condense to resinous solids upon heating have a number of uses, there are other uses for which such compositions are completely unsuitable. For instance, heat exchange fluids must remain liquid even at elevated temperatures and products which solidify upon heating are obviously without value.

Now according to the present invention it has been found that novel alkyl silicones containing from 1.0 to 1.1 alkyl groups per silicon atom which are liquids and which remain liquid even upon heating either at atmospheric pressure or under vacuum, and hence are useful as heat transfer media, may be prepared by processes comprising hydrolyzing a monoalkyl trichlorosilane at about 0° C. whereby a silanol is produced, and dehydrating this silanol under high vacuum to produce a liquid condensation product.

As used in describing this invention the term "alkyl" refers to a monovalent radical derived from an aliphatic hydrocarbon by removal of one hydrogen atom. The group may be relatively long chain, such as decyl, dodecyl, or octadecyl, or it may be relatively short chain, such as methyl, ethyl, or propyl. In a particularly preferred embodiment of the invention the alkyl group may be the butyl group, especially the normal butyl group.

A novel composition of this invention contains from 1.0 to 1.1 alkyl groups per silicon atom. It will be understood, of course, that this is an average figure and that for any particular silicon atom the number of alkyl groups will be expressed by whole numbers from 0 to 3. However, the product will, in any event, consist predominantly of material having one alkyl group per silicon atom.

In stating the proportion of alkyl groups to silicon atoms only such alkyl groups as are directly attached to the silicon are considered.

In making a novel alkyl silicone according to this invention a monoalkyl trichlorosilane is hydrolyzed at about 0° C. This is easily accomplished, for instance, by pouring the trichloro compound into crushed ice. The hydrolysis is exothermic and the heat of the reaction is taken up by the melting of the ice. It is important that the temperature at this point be not allowed to rise substantially above about 0° C. Supercooling below about 0° C. is not detrimental.

By the hydrolysis an alkyl silanol is produced, that is, a product having alkyl groups and hydroxyl groups attached to silicon atoms. In a process of this invention the silanol is dehydrated under high vacuum to form the liquid silicone. This is preferably accomplished by extracting the silanol with a suitable solvent such as diethyl ether or benzene, evaporating the solvent, and then dehydrating the silanol by subjecting it to high vacuum at ordinary temperature, that is, from 20 to 30° C. The product thus obtained can be distilled under vacuum if desired.

By high vacuum is meant a pressure of from 0.1 to 3.0 mm. of mercury. Such vacuum may be built up by any of the evacuating devices with which the art is familiar, a mechanical vacuum pump or mercury vapor pump being quite satisfactory. The product obtained is characterized by having from 1 to 1.1 alkyl groups per silicon atom and by being a liquid. This is in direct contrast to other similar alkyl silicones having more or less alkyl groups per silicon atom, such materials being solids or, at best, sticky resins.

The invention will be better understood by reference to the following illustrative example:

In 214 parts by weight of diethyl ether was dissolved 60 parts by weight of normal butyl trichlorosilane. The trichloro compound was then hydrolyzed by pouring the solution into 500 parts by weight of cracked ice. The rate of addition was such that the temperature did not exceed about 0° C. even locally. Stirring was continued until the ice melted and a supernatant ether layer formed. This ether layer was removed and evaporated under vacuum and without heating. Thirty-eight and six tenths parts by weight of a liquid residue was obtained.

A portion of this liquid residue was heated under vacuum. It was found to distill rapidly at 325° C. under 2 mm. of mercury. The product obtained by such distillation had a carbon content of 43.5%, a hydrogen content of 8.15%, and a silica content, expressed as $SiO_2$, of 51.65%. The apparent molecular weight was 1168. A portion of the product which distilled at from 250 to 325° C. at 2 mm. pressure had a carbon content of 44.5%, a hydrogen content of 8.46%, a silica content of 51.64% (expressed as $SiO_2$), and apparent molecular weight of 1276. The product, both before and after distillation at elevated temperature was liquid.

In contrast a portion of the hydrolyzed product which was heated at atmospheric pressure rather than under vacuum gave a rubbery gel.

I claim:

1. In a process for producing a liquid alkyl silicone the steps comprising hydrolyzing monoalkyl trichlorosilane at about 0° C. by pouring an ether solution of the trichloride onto ice, whereby a silanol is produced, separating an ether solution of the silanol from the water formed by the melting of the ice, evaporating the ether and dehydrating the silanol under high vacuum to produce a liquid condensation product.

2. In a process for producing a liquid butyl silicone the steps comprising hydrolyzing monobutyl trichlorosilane at about 0° C. by pouring an ether solution of the trichloride onto ice, whereby a silanol is produced, separating an ether solution of the silanol from the water formed by the melting of the ice, evaporating the ether and dehydrating the silanol under high vacuum to produce a liquid condensation product.

3. A liquid butyl silicone containing between 1.0 and 1.1 butyl groups per silicon atom, prepared by hydrolyzing monobutyl trichlorosilane at about 0° C. by pouring an ether solution of the trichloride onto ice, whereby a silanol is produced, separating an ether solution of the silanol from the water formed by the melting of the ice, evaporating the ether and dehydrating the silanol under high vacuum to produce a liquid condensation product.

RALPH K. ILER.

REFERENCES CITED

The following references are of record in the file of this patent:

UNITED STATES PATENTS

| Number | Name | Date |
|---|---|---|
| 2,258,220 | Rochow | Oct. 17, 1941 |
| 2,432,891 | Hervey | Dec. 16, 1947 |
| 2,465,188 | Barry | Mar. 22, 1949 |